United States Patent Office 3,380,202
Patented Apr. 30, 1968

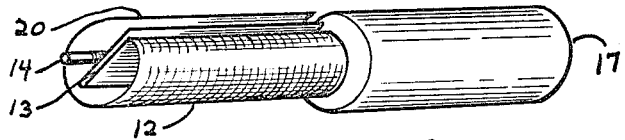
FIG. 1
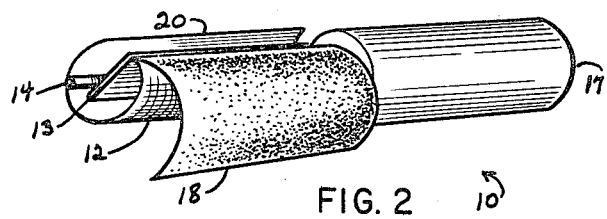
FIG. 2
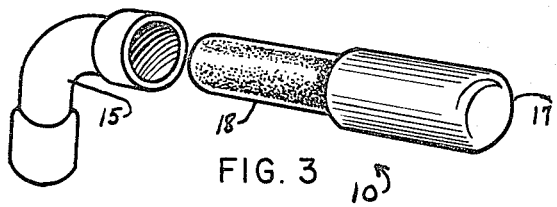
FIG. 3
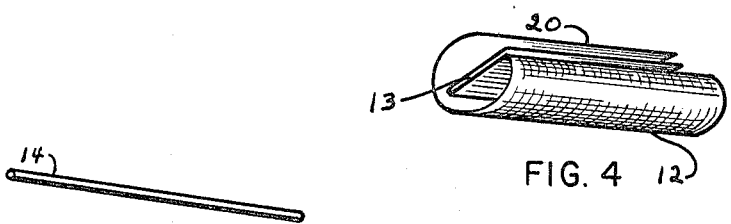
FIG. 4
FIG. 5
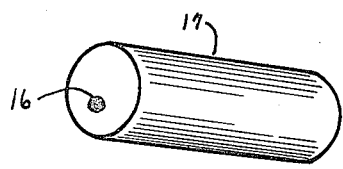
FIG. 6
*INVENTOR.*
Joseph E. Hartinger
BY

3,380,202
SOLDER FITTING CLEANING TOOL
Joseph E. Hartinger, Brown County, Wis.
(725 Turek St., Green Bay, Wis. 54302)
Filed Jan. 25, 1966, Ser. No. 525,002
3 Claims. (Cl. 51—364)

This invention relates to abrading devices, and more particularly to an abrading tool for cleaning the internal surfaces of solder fittings preparatory to soldering.

It is an object of the present invention to provide a novel and improved abrading tool which conveniently abrades the internal surfaces of solder fittings in a simple and efficient manner.

Another object of the present invention is to provide a solder fitting cleaning tool that is extremely durable, and which uses a readily replaceable abrading material, such as aluminum oxide cloth.

Still a further object of the present invention is to provide a solder fitting cleaning tool which can be produced, packaged, and sold in large quantities at a comparatively low cost, and which can be conveniently utilized wherever needed.

Still additional objects, benefits, and advantages of this invention will become evident from a study of the following detailed description taken in conjunction with the accompanying drawing, in which:

FIGURE 1 is a perspective view of the solder fitting cleaning tool made in accordance with the present invention.

FIGURE 2 is the same view as FIGURE 1 except that the abrading cloth, with abrasive side out, is inserted in the holding slot of the solder fitting cleaning tool.

FIGURE 3 shows the solder fitting cleaning tool, with abrasive cloth wrapped around it, ready to be inserted in the solder fitting.

FIGURE 4 shows the rubber-coated spring steel body of the tool.

FIGURE 5 shows the drive shaft only.

FIGURE 6 shows the handle only.

Referring now specifically to the drawing, a solder fitting cleaning tool 10 made in accordance with the present invention is shown to include a cylindrical rubber coated sleeve of spring steel 12 with a slot 13 bent to the inside of the sleeve 12. The steel drive shaft 14 is soldered to the inside trailing end 20 of the sleeve 12. The degree of expansive force created when the tool 10 is turned clockwise in a solder fitting 15 is determined by the distance the drive shaft 14 is soldered from the inside trailing end 20 of the sleeve 12. The drive shaft 14 is cemented into the off-center hole 16 of the plastic handle 17.

The operation of this device will now be readily understood. A solder fitting 15 can be cleaned in the following manner:

The end of a piece of abrasive material 18 is inserted into the slot 13 as far as it will go and wrapped around the sleeve 12, with the abrasive side out. It is cut or torn off from the roll or larger piece at the trailing end 20. The tool 10, with abrasive material 18 wrapped around it, is then squeezed between thumb and forefinger enough so that it is easily inserted into a solder fitting 15. The tool 10 is then turned in a clock-wise direction until the solder fitting 15 is clean. A different diameter size tool 10 is required for every different diameter size solder fitting 15. The abrasive material may be re-used by reversing ends.

While this invention has been described with particular reference to the construction shown in the drawing and while various changes may be made in the detail construction, it shall be understood that such changes shall be within the spirit and scope of the present invention as defined by the appended claims.

Having thus completely and fully described the invention, what is now claimed as new and desired to be protected by Letters Patent of the United States is:

1. A solder fitting cleaning tool comprising, in combination, a cylindrical, rubber-coated sleeve of spring steel with a slot bent to the inside of the sleeve and secured to a handle by a steel drive shaft which is soldered to the inside trailing end of the cylindrical sleeve, and which uses a readily replaceable abrasive cleaning material.

2. A solder fitting cleaning tool, as set forth in claim 1, wherein an expansive force is created as the tool is turned clock-wise in a solder fitting.

3. A solder fitting cleaning tool, as set forth in claim 1, wherein the rubber-coated sleeve aids in holding the abrasive material securely to itself and also aids in cleaning irregularities which may be present in solder fittings.

References Cited

UNITED STATES PATENTS

| 392,608 | 11/1888 | Hinman | 51—364 |
| 1,773,176 | 8/1930 | Groetchen | 51—364 X |

JAMES L. JONES, Jr., Primary Examiner.